Dec. 2, 1969   A. H. NELSON   3,481,504
LIQUID STORAGE CONTAINER
Filed July 5, 1968
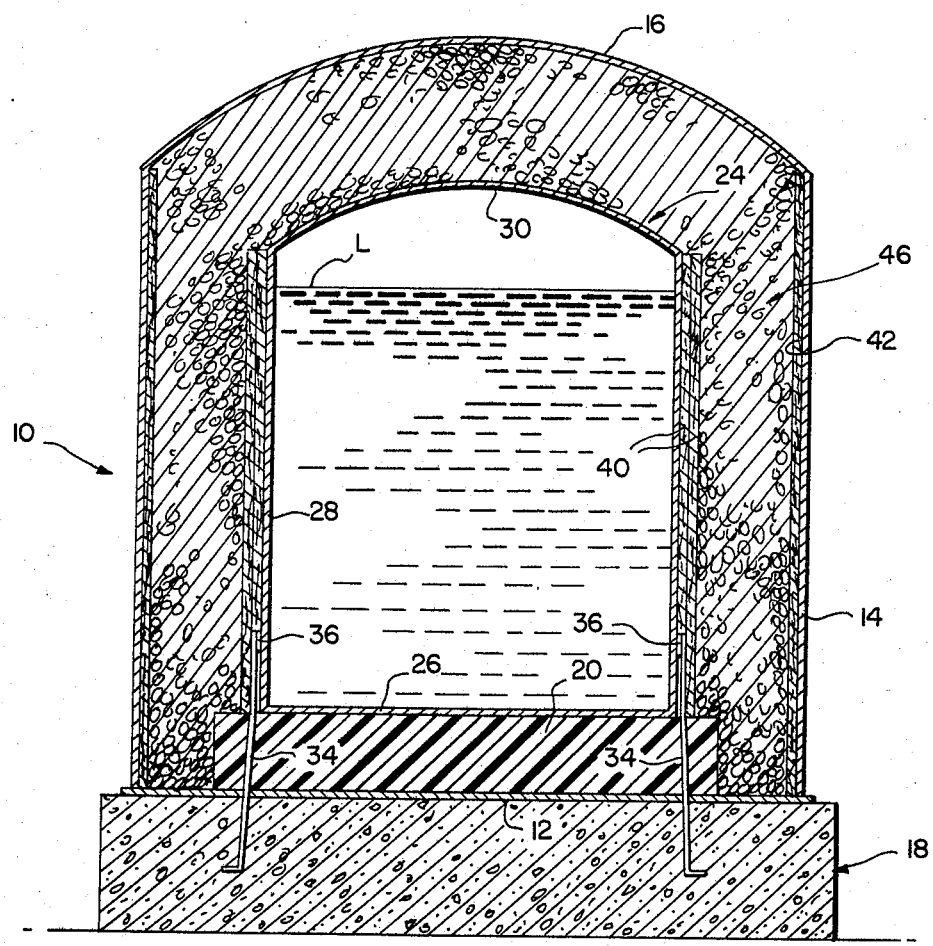
INVENTOR
ARDELL H. NELSON
BY  *Shoemaker and Mattare*
ATTORNEYS United States Patent Office 3,481,504
Patented Dec. 2, 1969

3,481,504
LIQUID STORAGE CONTAINER
Ardell H. Nelson, Coraopolis, Pa., assignor to Pittsburgh-Des Moines Steel Company, Pittsburgh, Pa., a corporation of Pennsylvania
Filed July 5, 1968, Ser. No. 742,565
Int. Cl. B65d 25/18
U.S. Cl. 220—9                                              1 Claim

ABSTRACT OF THE DISCLOSURE

A liquid storage container includes inner and outer vessels spaced from one another to define an insulating space therebetween. The side walls of the inner and outer vessels each have resilient blanket means disposed adjacent the opposed facing surfaces thereof and defining a space therebetween. The space between the resilient blanket means is filled with a mass of substantially free-flowing lightweight thermal insulating material.

BACKGROUND OF THE INVENTION

The present invention relates to a liquid storage container which is especially adapted to store normally gaseous substances in a liquefied state at pressures near atmospheric pressure and temperatures near the boiling point of the liquid. It is well recognized that by storing gaseous substances such as hydrogen, oxygen, methane, ethylene and the like at low temperatures whereby the substances are in a liquid phase, the volume of the stored substance is greatly reduced so that large quantities of the substances can be stored in an economical manner.

The same general storage system could also be used for warm liquids as well as cold liquids since the problems caused by temperature differentials are similar in both instances. However, a refrigerated liquid storage system is generally referred to herein since it is more often utilized.

Since the liquid being stored is at a very low temperature, a heavily insulated tank must be provided. Conventional insulation materials are quite expensive, and a number of problems are encountered when using same. It is desirable to employ a relatively inexpensive substantially free-flowing lightweight thermal insulating material such as expanded perlite and the like in the insulating space provided between the inner and outer vessels of the usual double-walled tank employed in refrigerated storage applications.

A particular problem encountered with this type of insulating material is the fact that such a free-flowing type of material has a tendency to settle or move vertically downwardly within the insulating space between the side walls of the inner and outer vessels when the side walls move away from or relative to one another, or in other words when the inner vessel side wall contracts, or the outer vessel side wall expands.

On the other hand, when the side walls of the vessels move toward one another as when the inner vessel side wall expands or the outer vessel side wall contracts, the particles of the insulating material are compacted and crushed. As a result of this alternate compaction and crushing and downward settling due to relative movements of the side walls of the inner and outer vessels, the upper regions of the insulation space between the side walls of the two vessels may not be completely filled with insulation thereby resulting in excessive heat transfer through such voids.

Additionally, continued cyclic expansion and contraction of the associated side walls of the vessels results in increased lateral pressure of the insulating material due to the compaction and crushing of the particles of insulating material which may cause buckling or rupturing of the vessels.

The side wall of the inner vessel moves laterally in accordance with temperature changes within the vessel as caused by filling of the vessel with cold liquid or evacuation of the vessel with a subsequent return to atmospheric temperature. Additionally, the height of the stored liquid within the vessel causes temperature gradients within the vessel itself. In addition to thermally induced lateral movements of the side wall of the inner vessel, stress induced lateral movements also occur.

Temperatures on the side wall of the outer vessel may fluctuate as much as 150° F. during a single day, thereby causing substantial thermally induced lateral movements of the outer vessel wall. Movements of the side wall of the outer vessel can be very detrimental since these movements will occur daily with ambient temperature changes.

It is accordingly necessary to provide means for preventing settlement and load build-up of the free-flowing insulating material between the side walls of the vessels due to the lateral movements of both the inner and outer vessel side walls.

When settlement and compaction of the free-flowing insulating material between the side walls of the vessels is prevented by suitable means, there is little movement or settlement of any insulating material above this region since there is no place for this insulating material to shift to, and thus it remains where originally placed.

SUMMARY OF THE INVENTION

In the present invention, resilient blanket means are disposed adjacent the outer surface of the side wall of the inner vessel as well as adjacent the inner surface of the side wall of the outer vessel. These resilient blanket means are spaced from one another, and a mass of substantially free-flowing lightweight thermal insulating material fills the space between the blanket means and exerts a lateral pressure against both of the blanket means.

Each of these resilient blanket means resists the active lateral pressure of the free-flowing insulating material disposed between the blanket means without substantial deflection of the blanket means. On the other hand, each of the blanket means is adapted to deflect or compress elastically without permanent set upon any increase in lateral pressures due to lateral movements of the adjacent side wall of one of the vessels resulting from stresses thereon or temperature changes. With a subsequent decrease in the lateral pressure due to lateral movemnts of the adjacent side wall of one of the vessels resulting from a change in stresses or temperature, the blanket means expands to its original position thus preventing any shift of the free-flowing insulating material.

Accordingly, when one of the side walls of the vessel expands or contracts, the resilient blanket means disposed adjacent thereto will contract or expand in a complementary manner so that the spacing between the resilient blanket means will remain substantially the same so as to prevent the mass of free-flowing material between the resilient blanket means from dropping downwardly within the insulating space or from being compacted and crushed.

The resilient blanket means and the free-flowing insulating material are placed in the insulating space between the inner and outer vessels when the storage tank is at ambient temperature, and the weight of the free-flowing material will cause the resilient blanket means to be slightly compressed. Accordingly, after several movements of the side walls of the vessel due to changes in stresses or temperature, an equilibrium position is reached by the resilient blanket means and thereafter only insignificant amounts of compaction and crushing take place.

BRIEF DESCRIPTION OF THE DRAWING

The figure is a vertical section through a storage tank according to the present invention.

DESCRIPTION OF THE PREFERRED EMBODIMENT

Referring now to the drawing, a form of the invention is illustrated in the figure thereof and includes an outer vessel indicated generaly by reference numeral 10 having a flat bottom 12, a substantially cylindrical side wall 14 and a roof 16. The bottom 12 rests upon a suitable foundation 18 formed of concrete and the like.

A body of load-bearing insulation 20 rests upon the bottom 12 of the outer vessel, this body of load-bearing insulation comprising for example, foam-glass and the like. An inner vessel indicated generally by reference numeral 24 includes a bottom 26, a substantially cylindrical side wall 28 and a domed roof 30. The bottom 26 of the inner vessel rests upon the body 20 of load-bearing insulation.

A plurality of anchor straps 34 are secured as by welding to pads 36 rigidly affixed as by welding to the outer surface of the side wall 28 of the inner vessel. These anchor straps extend downwardly through the body of load-bearing insulation 20, through the bottom 12 of the outer vessel and are embedded within the foundation 18 for rigidifying the structure.

A suitable liquid is disposed within the inner vessel, the upper level of the liquid disposed within the vessel being indicated by reference character L. It should be understood that suitable means is provided for introducing liquid and gas into and discharging liquid and gas from the inner vessel including nozzles, valves, pipes and the like which are of conventional construction and which have not been shown for simplicity of illustration.

The outer vessel which serves primarily as an insulation protector and vapor barrier and for withstanding the lateral forces of the insulating material between the inner and outer vessels may be formed of metal or other materials suitable for this purpose, such as mild steel. The inner vessel which is designed to contain the liquefied gas and to withstand the lateral pressure of the insulating material between the two vessels may be formed of metal or other materials suitable for this purpose such as aluminum and the like having the necessary properties over the temperature ranges to which it is subjected.

A first resilient blanket means includes one or more adjacent layers of resilient material 40 disposed in surrounding relationship to the outer surface of the side wall 28 of the inner vessel. A second resilient blanket means includes one or more adjacent layers of resilient material 42 disposed adjacent to the inner surface of the side wall of the outer vessel and is disposed in opposed facing relationship to the first-mentioned blanket means and is substantially coextensive therewith. The two resilient blanket means are disposed in contact or close proximity with the associated side walls of the inner and outer vessels respectively and the blanket means define a space therebetween. The resilient blanket means are retained in operative position until installation of the free-flowing insulating material by adhesive or suitable fasteners (not shown) affixed to and extending from the adjacent side walls of the associated vessel. After the substantially free-flowing insulating material has been installed, the resilient blanket means are secured permanently in their operative position by the lateral pressure of the substantially free-flowing insulation.

It will be noted that the thickness of the blanket means adjacent the side wall of the inner vessel is substantially greater than the thickness of the blanket means disposed adjacent the side wall of the outer vessel. In the illustrated embodiment, the first-mentioned blanket means is two or more times thicker than the thickness of the second-mentioned blanket means. This is due to the fact that with the inner vessel at a much lower temperature than the outer vessel, the respective movements are greater. However, the more frequent daily ambient movement of the outer vessel wall can be very detrimental to settlement of the substantially free-flowing insulation material if the blanket means adjacent to the outer vessel wall is not used.

The space between the two blanket means as well as the space between the spaced roofs 16 and 30 of the outer and inner tanks respectively is filled with a mass of substantially free-flowing lightweight thermal insulating material preferably of a granular nature 46. In a typical example, the free-flowing insulating material may comprise expanded perlite. This insulating material must have a particle size sufficiently small to prevent convection losses by circulation of air through the packed mass.

To avoid combustion problems as for example encountered in the storage of liquid oxygen, the free-flowing insulation material is preferably an inorganic substance such as expanded perlite, expanded vermiculite, inorganic aerogels such as silica aerogel and the like. This free-flowing insulating material may also for example comprise granulated cork, shredded foam polystyrene and the like. Other fibrous materials such as shredded wood or bark, fiberglass waste or mineral wool may be used. In any event, the insulating material should be non-cohesive or substantially free-flowing.

The resilient blanket means must resist lateral pressure of the free-flowing insulating material without substantial deflection but must deflect or compress elastically without permanent set when the associated side walls of the respective vessels move in a lateral direction. In other words, when the side wall of the inner vessel contracts, the blanket means 40 will expand, and on the other hand, when the side wall of the inner vessel expands the blanket means 40 will be compressed. On the other hand, when the side wall of the outer vessel contracts, the blanket means 42 will be compressed, whereas when the side wall of the outer vessel expands, blanket means 42 will also expand. In this manner, the annular space between the two resilient blanket means is maintained substantially constant.

The resilient blanket means must retain its resilient characteristics at extremely low temperatures, and a preferred blanket means comprises sheets of matted glass fibers, formed into a resilient mass and held in place by means of a suitable binder. For example, a low density resilient blanket means formed of fine glass fibers bonded together by a binder such as a thin film of phenol-formaldehyde resin binder is suitable. The nominal diameters of the glass fibers of the blanket means may be less than 0.00015 inch. This type of blanket means may have a density of approximately two pounds per cubic foot.

The thickness of the blanket means is sufficient so that it is adapted to expand and be compressed to the necessary degree to accommodate the movements of the associated side walls of the respective vessels.

The resilient blanket means may also be formed of other fibrous or suitable flexible materials, and for example the blanket means may be made of acetate synthetic fibers suitably bonded together.

As this invention may be embodied in several forms without departing from the spirit or essential characteristics thereof, the present embodiment is therefore illustrative and not restrictive.

I claim:

1. A liquid storage container comprising an inner vessel having a bottom wall, a side wall and a roof, an outer vessel having a bottom wall, a side wall and a roof, the roofs being in spaced relation and the side wall of said outer vessel being spaced outwardly of the side wall of said inner vessel to define an insulating space therebetween, first resilient blanket means being disposed within said insulating space and contacting substantially the entire outer surface of the side wall of said inner vessel, second resilient blanket means disposed within said insulating space and contacting substantially the entire inner surface of the side wall of the outer vessel, said first and second resilient blanket means being spaced from one another, a thermal insulating material between said roofs and a free-flowing insulating material filling the space between said first and second blanket means and exerting a lateral pressure against both of said blanket means and the upper end of each of said blanket means terminating substantially at the peripheral edge of the adjacent roof wherein the roofs are free of said blanket means.

References Cited

UNITED STATES PATENTS

| | | | |
|---|---|---|---|
| 2,916,179 | 12/1959 | Monroe | 220—15 |
| 3,007,596 | 11/961 | Matsch | 220—9 |
| 3,147,878 | 9/1964 | Wissmiller | 220—9 |
| 3,265,236 | 8/1966 | Gibbon et al. | 220—9 |
| 3,362,559 | 1/1968 | Kohring | 220—9 |
| 3,378,162 | 4/1968 | Smith | 220—9 |

GEORGE E. LOWRANCE, Primary Examiner

JAMES R. GARRETT, Assistant Examiner